United States Patent [19]

Catanzaro

[11] Patent Number: 4,942,004
[45] Date of Patent: Jul. 17, 1990

[54] METHOD AND APPARATUS FOR REGULATING MOLD CLAMPING FORCE IN AN INJECTION MOLDING MACHINE

[75] Inventor: John C. Catanzaro, Lebanon, Ohio

[73] Assignee: Cincinnati Milacron Inc., Cincinnati, Ohio

[21] Appl. No.: 265,709

[22] Filed: Nov. 1, 1988

[51] Int. Cl.$^5$ .................................................. B29C 45/82
[52] U.S. Cl. ...................................... 264/40.5; 425/149; 425/155; 425/595
[58] Field of Search ............... 264/40.1, 40.5, 328.1; 425/135, 149, 150, 155, 156, 589, 590, 595

[56] References Cited

U.S. PATENT DOCUMENTS

| | | | |
|---|---|---|---|
| 2,790,204 | 4/1957 | Edwards et al. | |
| 3,226,769 | 1/1966 | Williamson et al. | 425/590 |
| 3,534,442 | 10/1970 | Mahle | |
| 3,579,741 | 5/1971 | Schwartz | |
| 3,825,386 | 7/1974 | Bello et al. | 425/150 |
| 3,939,329 | 2/1976 | Doran | 425/149 |
| 3,940,930 | 3/1976 | Rosander | 425/590 |
| 4,120,631 | 10/1978 | Leutner et al. | 425/145 |
| 4,269,580 | 5/1981 | Wright | 425/150 |
| 4,281,977 | 8/1981 | Farrell | 425/149 |
| 4,335,063 | 6/1982 | Kolb et al. | |
| 4,356,763 | 11/1982 | Hagstrom | 100/48 |
| 4,370,116 | 1/1983 | Groom | 425/171 |
| 4,696,632 | 9/1987 | Inaba | 425/150 |
| 4,710,119 | 12/1987 | Otake | 425/136 |
| 4,726,920 | 2/1988 | Yokota | 264/40.5 |

Primary Examiner—Jill L. Heitbrink
Attorney, Agent, or Firm—Nies, Kurz, Bergert & Tamburro

[57] ABSTRACT

A method and apparatus for controlling the hydraulic pressure in an hydraulic clamping cylinder to correspond with a desired clamping force and to compensate for overshoot of the hydraulic pressure caused by time delays in operating the components in the hydraulic circuit. The control arrangement involves the sensing of the actual hydraulic pressure during the clamp force maintenance portion of a clamping cycle and comparing the actual pressure with a desired pressure to provide a correction signal to be utilized to control the operation of the hydraulic system during the next succeeding cycle so that the actual hydraulic pressure during the clamp maintenance portion of the clamping cycle during the next succeeding cycle results in a clamping force that is closer to the desired clamping force.

10 Claims, 3 Drawing Sheets

METHOD AND APPARATUS FOR REGULATING MOLD CLAMPING FORCE IN AN INJECTION MOLDING MACHINE

BACKGROUND OF THE INVENTION

1. Field of the Invention

This invention relates to an improved method and apparatus for providing a desired hydraulic clamping pressure in an hydraulically operated clamping press. More particularly, the present invention relates to a method and apparatus for controlling the clamping force exerted by the mold clamping system of an injection molding machine in order to provide a mold closing force that corresponds with a predetermined mold closing force, so that plastic material injected into the mold under high pressure does not flash from the mold as a result of mold separation during the injection step.

2. Background of the Related Art

Injection molding machines include a plastication and injection unit for converting solid polymeric material from solid pellets to a flowable liquid that can be injected under pressure into a closed mold cavity in order to completely fill the mold cavity and provide the desired molded article. The mold in which the desired article is formed is typically a multiple part mold, which could be as few as two parts, that is adapted to be closed while the polymeric material is being injected into the cavity defined by the mold parts when they are in contact with each other, and which is then adapted to be opened, by separating the mold parts, in order to permit removal of the molded article.

Such machines include apparatus for moving the mold parts into and out of engagement with each other, and also include a clamping arrangement that is intended to apply a clamping force to hold the molds in tightly engaged relationship while the injection of the polymeric material is taking place. In that regard, injection pressures can typically range in the thousands of pounds per square inch, and when that pressure is exerted within the closed mold cavity, the pressure acts on the mold cavity surfaces with a resultant force that tends to urge the mold parts apart from each other. Consequently, clamping apparatus is provided for holding the mold parts tightly together to prevent such separation, and typically the clamping apparatus includes an hydraulically operated clamp that is capable of providing high clamping forces on the mold halves, the magnitude of the forces depending upon the sizes of the mold cavities and on the areas of the surfaces over which the pressure of the injected plastic material acts. Injection molding machines are presently commercially available that are capable of providing clamping forces as large as 1,000 tons and more.

In the past, the prevalent practice that was followed to maintain the clamping force during the time the polymeric material was being injected into the mold cavity, and during the time the injected material was being cooled while within the mold, involved the provision of at least one hydraulic pump for the clamp cylinder, and the pump was operated continuously during the time clamping forces were desired in order to maintain the hydraulic pressure in the clamping system at a sufficient level to provide the desired clamping force. The maximum hydraulic pressure in the clamping system was controlled by providing a relief valve between the pump and the hydraulic clamp cylinder, so that the hydraulic pressure within the clamp cylinder did not exceed a predetermined value. Such a system is disclosed in U.S. Pat. No. 3,825,386, which issued July 23, 1974, to Wolfert Bello et al., in which hydraulic pressure from a pump is maintained continuously on a pressure cylinder to maintain a desired clamping force, and a pressure controlled directional valve is provided to regulate the volume of flow from the continuously operating pump to the clamp cylinder. Such previously favored arrangements for maintaining clamping force involve additional equipment and cost in terms of requiring a pump merely for the clamp force maintenance function, and they also require the expenditure of unnecessary energy by continuously driving the pump while simultaneously conveying a part of the pump outlet through a pressure relief valve to a fluid reservoir, which resulted in wasted energy.

It is an object of the present invention to overcome the deficiencies of the previous clamp force maintenance arrangements.

It is a further object of the present invention to provide a clamp force maintenance system in which the need for a continuously operating hydraulic pump is eliminated.

It is a still further object of the present invention to provide a clamp force maintenance system that does not require either a continuously operating hydraulic pump or a pressure relief valve in the clamp force maintenance circuit.

SUMMARY OF THE INVENTION

Briefly stated, in accordance with one aspect of the present invention, hydraulic clamp force maintenance apparatus is provided in an injection molding machine that includes an hydraulic clamp cylinder and piston slidably carried in the cylinder for applying and maintaining a clamping force on a multiple part, separable mold, in order to maintain the mold parts in a closed condition as plastic material is being injected into the mold cavity at a high pressure. The apparatus includes a pressurizing means for providing hydraulic fluid under pressure to the clamp cylinder and valve means positioned between the pressurizing means and the clamp cylinder, the valve means being operable selectively between an open position to permit flow of pressurized fluid from the pressurizing means to the clamp cylinder, and a closed position to prevent flow of hydraulic fluid from the clamp cylinder in order to maintain hydraulic fluid under pressure within the clamp cylinder. A pressure transducer is provided in communication with the hydraulic cylinder for providing an output signal representative of the hydraulic fluid pressure within the cylinder. Set point setting means are provided for setting a predetermined set point clamping force value, and comparator means are connected with the pressure transducer means and with the set point setting means for comparing the output signal of the pressure transducer means during a clamp force maintenance portion of a clamp operating cycle, with the set point clamping force value to provide a correction signal representative of the difference between the clamping force represented by the transducer output signal and the set point clamping force value. Control means are connected with the comparator means and with the valve means to provide a control signal for regulating the opening and closing of the valve means during the next succeeding clamp operating cycle in order to provide a clamping force during the clamp force maintenance portion of that next succeeding cycle that is closer to the set point clamping force value than was the clamping force in the immediately preceding clamp operating cycle.

In connection with another aspect of the present invention, a method is provided for regulating the clamping force in an hydraulic clamp cylinder of an injection molding machine. The method includes the step of providing a clamping force set point value corresponding with a desired clamping force to be imposed by a clamp hydraulic cylinder during a clamp force maintenance portion of a clamp operating cycle. A desired clamp cylinder hydraulic pressure value is determined to correspond with the desired clamping force value, and the actual hydraulic pressure in the hydraulic clamp cylinder during a first clamp operating cycle is sensed to provide a clamping pressure signal representative of the actual clamp cylinder hydraulic pressure during the clamp force maintenance portion of the clamp operating cycle. The sensed clamping pressure is compared with the desired clamping pressure, which is based upon the desired clamping force, to provide a signal representative of the difference between the two pressures. The time of closing of a flow control valve connected with the clamp hydraulic cylinder is controlled during the next succeeding clamp operating cycle as a function of the pressure difference and the pressure in the clamping cylinder at the time of closing of the flow control valve during the preceding clamp operating cycle. At least a part of the pressure difference is added to the pressure value at which the valve was closed during the preceding cycle in order to provide a clamping force that is closer to the desired clamping force.

DESCRIPTION OF THE PREFERRED EMBODIMENTS

Figure 1:
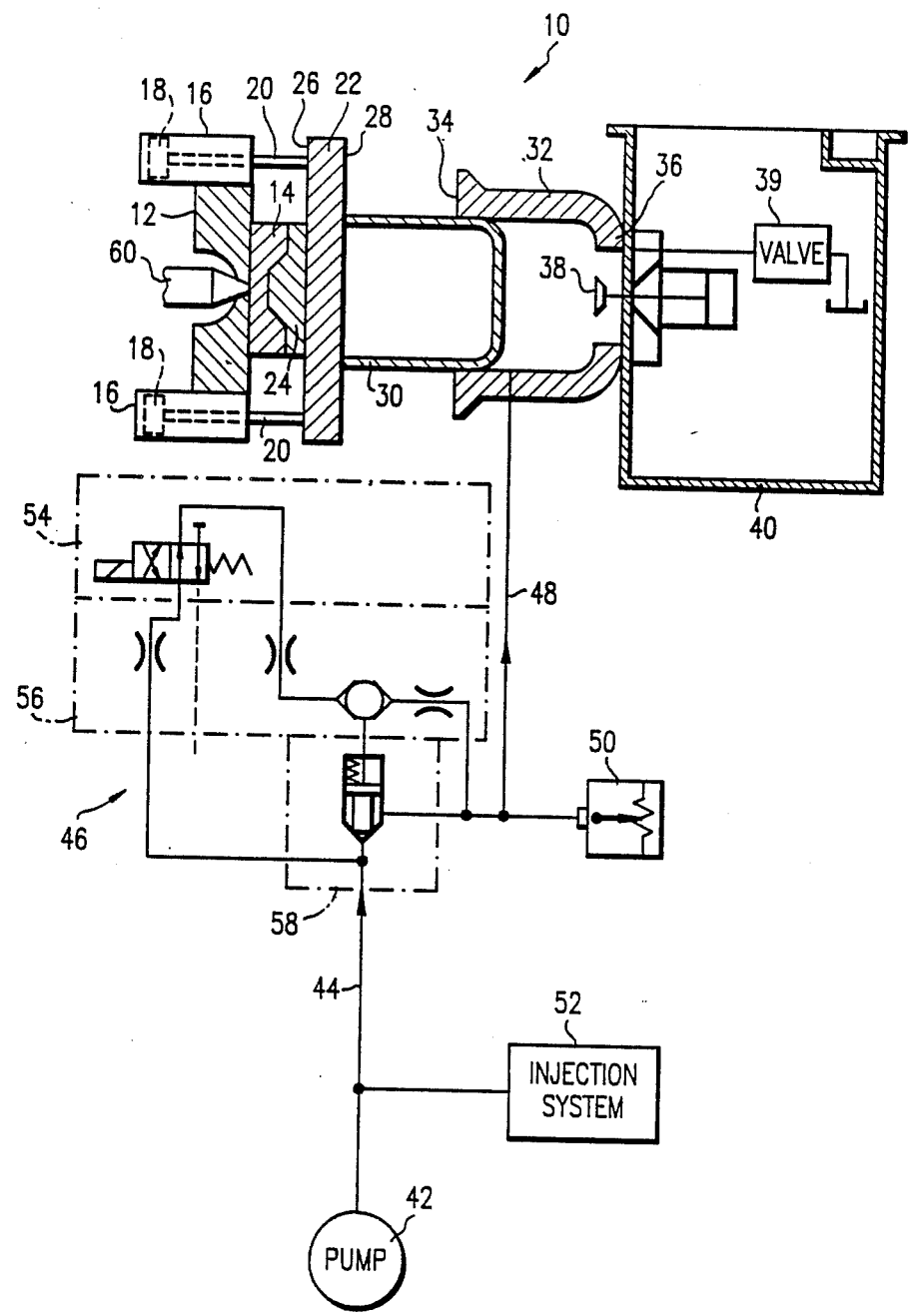
FIG. 1 is a schematic view of the molding station and mold clamping apparatus of an injection molding machine, showing the mold halves and the associated mold traversing and clamping system in accordance with the present invention.

Referring now to the drawings, and particularly to FIG. 1 thereof, there is shown the mold supporting and clamping system 10 of an injection molding machine for molding plastics parts. A stationary platen 12 is carried by a base (not shown) and securely supports a first, stationary mold half 14. Stationary platen 12 also supports a pair of rapid traverse cylinders 16 within which respective pistons 18 are movable and from which respective piston rods 20 extend in an outward direction beyond stationary mold half 14. A movable platen 22 is positioned opposite and facing stationary platen 12 and carries a second, movable mold half 24 on face 26 thereof. Mold half 24 is adapted to engage with stationary mold half 14 to define therebetween one or more mold cavities (not shown). Movable platen 22 is slidably carried on a plurality of spaced, parallel tie rods (not shown) that can be connected to stationary platen 12 to extend outwardly therefrom toward and beyond movable platen 22, so that movable platen 22 can be moved toward and away from stationary platen 12. Piston rods 20 of rapid traverse cylinders 16 are connected with movable platen 22, and the cylinders are adapted to quickly move movable platen 22 either toward or away from stationary platen 12 during the operating cycle of the machine.

Extending from opposite face 28 of movable platen 22 is a clamp piston 30 that is slidably carried in a sleeve-like clamp cylinder 32 that has an open end 34 and a closed end 36. Open end 34 faces movable platen 22 and closed end 36 includes a flow control valve 38, commonly referred to as a prefill valve, that is adapted to permit the flow of hydraulic fluid into and out of the clamp cylinder from and to reservoir 40. The purpose of valve 38 will be described hereinafter.

Pressurizing fluid for clamp cylinder 32 is obtained from a pressurizing system that includes an hydraulic pump 42, the output of which is conveyed through a pump conduit 44 to a second flow control valve 46 and then through clamp cylinder conduit 48. Preferably, flow control valve 46 is a zero-leakage, cartridge-type valve that tightly seals the fluid pathway between pump conduit 44 and clamp cylinder conduit 48 to minimize leakage from the clamp cylinder and thereby maintain the desired hydraulic pressure level in the clamp cylinder. A pressure transducer 50 is provided in clamp cylinder conduit 48 to sense the hydraulic pressure within clamp cylinder 32 and to provide an output signal representative of that hydraulic pressure.

The output of pump 42 can also be in communication with another system 52, which is designated schematically in the drawing, and which can be, for example, the injection system or any other system of the machine in which hydraulic fluid under pressure is required during the time valve 46 is closed.

As shown, valve 46 is in the form of an assembly that includes a directional flow control valve 54, a cover cartridge 56, and a cartridge valve 58, and can be a commercially available valve structure that is obtainable from Rexroth Corp., of Bethelhem, Pennsylvania. Although a particular type of cartridge valve structure has been illustrated and described, it will be apparent to those skilled in the art that other types of valves can be provided, if desired, to perform the same function as that of the cartridge valve structure disclosed herein.

The pressure transducer can be of any convenient and suitable type, such as, for example, a strain gage-type transducer, a piezoelectric transducer, or the like. A suitable pressure transducer can be obtained from Dynisco Inc., of Norwood, Massachusetts.

The source of the plasticated material that is injected into the mold cavity is the injection system, of which only a fragmentary representation of an injection barrel 60 is shown in FIG. 1. Injection barrel 60 is positioned on the opposite side of stationary platen 12 from that on which stationary mold half 14 is secured, and it includes an outlet that communicates with a passageway (not shown) that extends through stationary platen 12 and stationary mold half 14 to communicate with the mold cavity.

The clamping system shown operates from an initial position in which mold halves 12 and 24 are spaced from each other, which could result from the withdrawal from the mold cavity of a molded article that was molded in the preceding cycle. Mold halves 12 and 24 are closed by applying hydraulic pressure on the rod end of each of rapid traverse cylinders 16, which causes movable platen 22, along with movable mold half 24, to travel along the tie rods (not shown) toward stationary platen 12 and stationary mold half 14. The direction of movement is from right to left as viewed in FIG. 1, and the position of the parts as illustrated in FIG. 1 shows the mold halves 12 and 24 in cooperative engagement.

As movable platen 22 moves from right to left, clamp piston 30, which is secured thereto, moves along with it, outwardly from clamp cylinder 32 and in a direction away from prefill valve 38. During the outward movement of piston 30 from cylinder 32, prefill valve 38 is opened so that hydraulic fluid from reservoir 40 can flow through the prefill valve to occupy the space vacated by the outwardly moving piston and thereby fill the increasing volume of the clamp cylinder with hydraulic fluid. Such an operation eliminates the need to provide a high volume pump to fill the large volume vacated by the outwardly moving clamp piston.

When movable platen 22 has reached substantially its furthest position relative to clamp cylinder 32, and is in the position shown in FIG. 1, at which point mold halves 14 and 24 are substantially in contacting engagement, prefill valve 38 is closed, valve 46 is opened, and pump 42 is energized to provide pressurized hydraulic fluid through pump conduit 44, valve 46, and clamp cylinder conduit 48 in order to impose pressure on the hydraulic fluid within the clamp cylinder, and thereby provide a clamping force to hold the two mold halves together while high pressure plasticated material is being injected into the mold cavity. When the desired hydraulic pressure has been reached in the clamp cylinder, to provide the desired clamping force, valve 46 can be closed by a control signal provided by a control system, which will be hereinafter described. When valve 46 is closed, the fact that substantially no leakage occurs through the valve means that the pressure within clamp cylinder 32 is maintained until the hydraulic pressure in clamp cylinder 32 is released by a suitable decompression valve 39, which can be, for example, a pilot operated counterbalance valve to control the rate of release of the hydraulic pressure in the clamp cylinder. Likewise, during the time the clamping force is being maintained, pump 42 is not needed for maintaining the clamping force, and consequently the pump can either be shut down, or its output diverted to another system, such as, for example, the injection system 52, which comes into play while the clamping force is being maintained on the mold halves. After the plasticated material has been injected into the mold cavity the mold halves are maintained together for a short period of time while the plasticated material in the mold cavity is allowed to cool and solidify. At a predetermined time after injection has taken place, the pressure maintained in clamp cylinder 32 by valve 46 is released by opening decompression valve 39, after which prefill valve 38 is opened, and rapid traverse cylinders 16 are activated by providing pressurized hydraulic fluid at the head end of each of cylinders 16 to force the platens and mold halves apart, and to shift movable platen 22 toward clamp cylinder 32 in order to permit the molded article to be removed from the mold cavity. After removal of the molded part the cycle is repeated.

Pressure transducer 50 senses the hydraulic pressure within clamp cylinder 32 and can be used to provide an output signal when the desired hydraulic pressure is reached. However, because of time delays in the system, including the time required to actuate valve 46 to move the valve spool from an open to a closed condition, in practical effect the hydraulic pressure within the clamp cylinder continues to rise to a level above the desired pressure as a result of overshoot resulting from those time delays. Unless a correction is made to account for the overshoot, the hydraulic pressure, and consequently the clamping force, will be higher than the desired value, which could cause damage to the mold halves, and possibly also to the injection molding machine, if the pressure were excessively high.

In order to eliminate the effect of the overshoot in clamp cylinder hydraulic pressure resulting from the time delays in the hydraulic system, the present invention provides a control arrangement for correcting for the overshoot in a given operating cycle by applying a correction factor during the subsequent operating cycle in order to provide a clamp cylinder hydraulic pressure that results in the desired clamping force between the mold halves.

Figure 2:
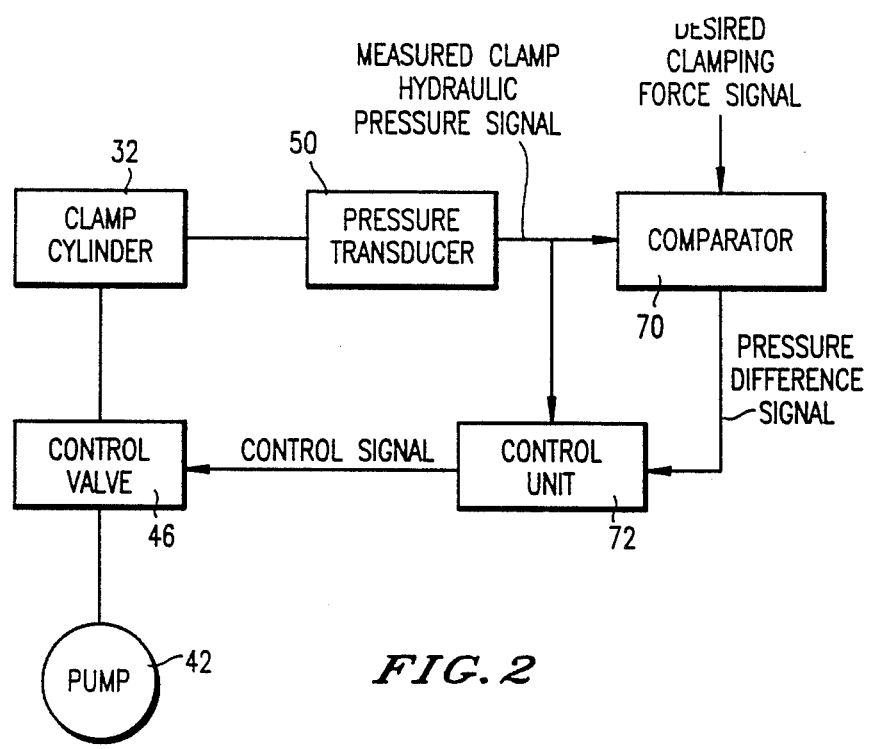
FIG. 2 is a block diagram showing the interconnection of the several parts to illustrate the control arrangement in accordance with the present invention.

Referring now to FIG. 2, pump 42 operates through control valve 46 to provide pressurized hydraulic fluid to clamp cylinder 32. The pressure within clamp cylinder 32 is sensed by pressure transducer 50, which provides an output signal representative of the clamp cylinder hydraulic pressure. The output signal changes in magnitude as the hydraulic pressure within clamp cylinder builds up as a result of the operation of pump 42, and when the desired pressure level is reached control valve 46 is closed. However, because of the time delays in the hydraulic system, resulting in overshoot of the pressure in the clamp cylinder, the steady-state pressure value in the clamp cylinder during the clamping phase of the cycle is higher than the desired pressure. The output signal corresponding with that steady-state value is provided to a comparator 70, into which the desired clamping force signal is also entered. The desired clamping force signal can be converted within the comparator to a pressure value by dividing the clamping force by the transverse cross-sectional area of the clamping piston against which the hydraulic pressure acts. Comparator 70 compares the pressure value corresponding with the desired clamping force with the measured steady-state clamp cylinder hydraulic pressure, which is in the form of the steady-state output signal from the pressure transducer, and subtracts that measured clamp hydraulic pressure from the desired hydraulic pressure to provide a pressure difference signal. The pressure difference signal is provided as an input to a control unit 72 that subsequently provides an output control signal that is representative of a new pressure level for use in the next succeeding clamp operating cycle to close control valve 46 at the proper part of the next succeeding clamp operating cycle. In that next cycle the clamp hydraulic pressure is continuously monitored by the pressure transducer, and when the new pressure level is reached the control unit sends a control signal to close the control valve.

The control signal from the control unit is the algebraic sum of the steady-state clamp hydraulic pressure as measured during the preceding cycle and the pressure difference signal based upon the operation of the clamp system during that preceding cycle. In that connection, the pressure difference signal can be either a positive or a negative quantity, depending upon the measured steady-state clamp hydraulic pressure in the initial operating cycle.

After a desired mold clamping time has elapsed, a suitable control signal is applied to decompression valve 39 to thereby release the pressure in clamp cylinder 32, whereupon the prefill valve is opened and the clamp piston is again retracted into the clamp cylinder.

During the next succeeding cycle, the pressurized fluid provided by pump 42 increases the hydraulic pressure level within the clamping cylinder, and pressure transducer 50 provides an output signal indicative of that changing pressure level to control unit 72. When the pressure transducer output signal reaches the pressure level that corresponds with a new pressure level based upon the sum of the measured steady-state clamp hydraulic pressure of the preceding cycle plus the pressure difference signal for that preceding cycle, control unit 72 provides a control signal to close control valve 46 in order to attempt to obtain a corrected hydraulic pressure within clamp cylinder 32. Several operating cycles may be necessary before the desired clamping force is achieved.

Essentially, then, the control arrangement in accordance with the present invention operates to sense operating parameters to determine the difference between the actual clamping force relative to the desired clamping force during a given clamp operating cycle, and then provides a correction signal to attempt to control the operation of the control valve so that the valve is closed either earlier or later than it had been closed in the preceding cycle, in order to correct the clamping force during the next operating cycle by either reducing the hydraulic pressure in the clamp cylinder or by increasing it.

The control arrangement illustrated in FIG. 2 can be achieved by separate components that provide the particular functions illustrated and described. Additionally, however, if desired a microprocessor can be provided to perform the functions of the comparator and the control unit as hereinbefore described.

Figure 3:
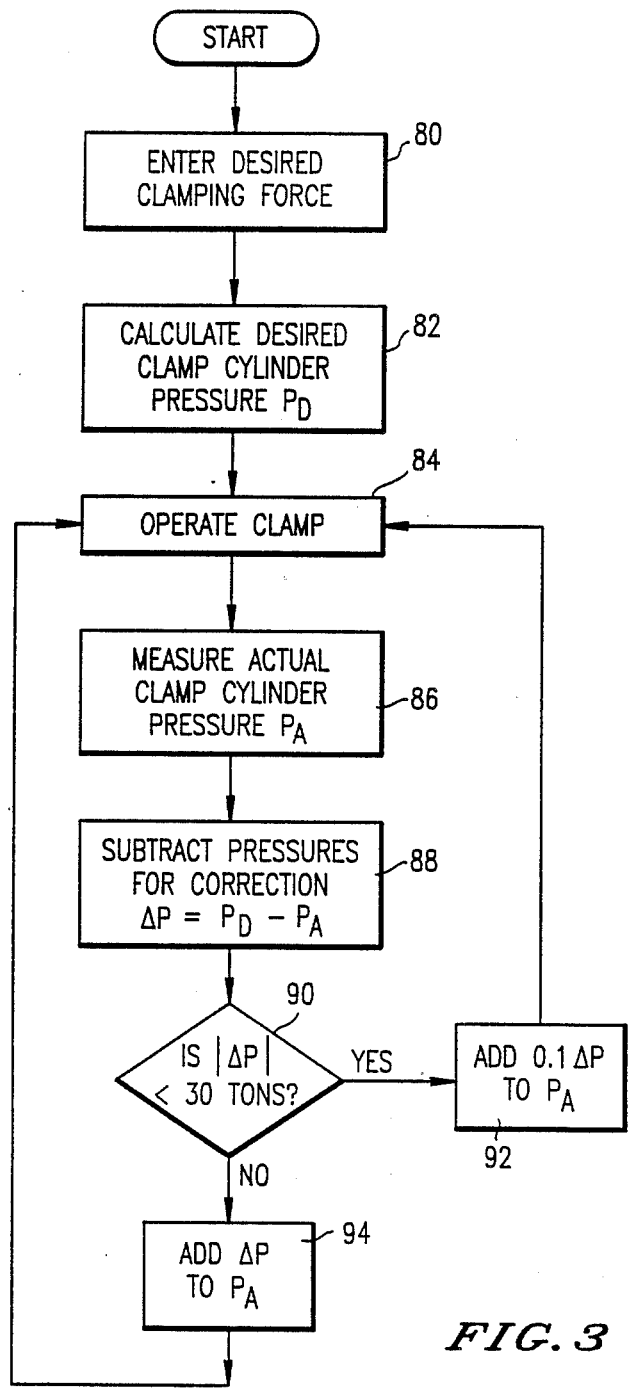
FIG. 3 is a flow chart showing the overall operation of the clamp force maintenance arrangement in accordance with the present invention.

Referring now to FIG. 3, there is shown a flow chart for the preferred embodiment of the invention and illustrating the various steps to provide the desired hydraulic pressure in the clamping cylinder. The system is started by entering a desired clamping force signal at step 80. The desired clamping force is determined by the machine user and is usually based upon the injection pressure to be utilized to inject the plasticated material into the mold and the projected area of the mold cavity over which that pressure will act. The desired hydraulic pressure that corresponds with the desired clamping force is calculated at step 82, based upon the cross-sectional area of the clamping piston, to provide a set point or desired pressure value $P_D$. The clamp is then operated through an operating cycle, step 84, in which the control unit closes the control valve when the desired pressure $P_D$ is reached, as sensed by the pressure transducer. However, because of the time delays within the system, the actual steady-state clamping pressure within the clamping cylinder is usually greater than the desired pressure by virtue of the overshoot of the pressure level resulting from time delays in the hydraulic system. Similarly, if some condition occurred that caused the valve to close earlier than desired, the actual hydraulic pressure within the cylinder would be less than the desired value. In either instance, the pressure transducer senses the hydraulic pressure within the clamping cylinder, and after the control valve has closed and the pressure within the clamp cylinder has reached a steady-state value, that steady-state value is considered in step 86 to be the actual hydraulic clamping pressure $P_A$ within the clamping cylinder. That actual hydraulic clamping pressure $P_A$ is compared with the desired hydraulic clamping pressure $P_D$, and if the two pressures are different the actual pressure is subtracted from the desired pressure in step 88 to provide a pressure difference signal P.

The magnitude of the pressure difference determined in step 88 affects the amount of pressure level correction that is used to set the clamp hydraulic pressure control signal to be provided in the next succeeding operating cycle. If it is determined in step 90 that the absolute value of the pressure difference P is less than a predetermined value, which, for example, can be selected to be 30 tons for an injection molding machine having a clamp system providing a maximum clamping force of 250 tons, then only a portion of that pressure difference is applied as a correction during the next succeeding cycle. As shown in FIG. 3, the additive portion is preferably limited to 10% of the pressure difference, although other percentages could also be selected, and that additive portion is added in step 92 to the actual steady-state hydraulic clamping pressure for that cycle to provide a new hydraulic clamp pressure value at which control valve 46 is closed during the next succeeding cycle. Thus, control valve 46 is closed in the succeeding operating cycle when the clamp hydraulic pressure sensed by the pressure transducer corresponds with the value that results from adding 10% of the pressure difference in the preceding cycle to the steady-state clamp hydraulic pressure that was sensed during the clamp pressure maintenance phase of that preceding operating cycle. As shown in FIG. 3, the correction process continues until the actual and the desired hydraulic clamping pressures are substantially equal.

If the determination in step 90 of the absolute value of the pressure difference reveals that the pressure difference is greater than the predetermined value, which, for example, can be 30 tons, then the control unit causes a greater change to occur in the new hydraulic clamp pressure value for the next succeeding cycle by adding, in step 94, the entire pressure difference determined in step 88 to the steady-state hydraulic clamping pressure that was obtained in the preceding cycle in step 86, in order to more rapidly reach the desired clamping force. The system then continuously monitors the clamp cylinder hydraulic pressure and makes appropriate changes to maintain it in substantial conformity with the desired pressure to achieve the desired clamping force.

It can thus be seen that the present invention provides a distinct improvement over the previous arrangements for maintaining hydraulic clamping pressure in the clamping system of an injection molding machine.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A method for regulating the clamping force in an hydraulic clamp cylinder of an injection molding machine, wherein a flow control valve is provided to control the flow of pressurized hydraulic fluid from a pump to the clamp cylinder, said method comprising:

(a) providing a clamping force set point value corresponding with a desired clamping force to be provided by a clamp hydraulic cylinder during a clamp force maintenance portion of a clamp operating cycle;

(b) determining a desired clamp cylinder hydraulic pressure value corresponding with the desired clamping force value;

(c) sensing actual hydraulic pressure in the hydraulic clamp cylinder during a first clamp operating cycle to provide an actual clamp cylinder hydraulic pressure during the clamp force maintenance portion of the clamp operating cycle;

(d) comparing the actual clamp cylinder hydraulic pressure with the desired clamp cylinder hydraulic pressure to provide a signal representative of the actual pressure difference between the actual and the desired pressures; and (e) during the next succeeding clamp operating cycle, controlling the time of closing of the flow control valve connected with the clamp hydraulic cylinder, relative to the time of closing of the flow control valve during the preceding clamp operating cycle, by adding at least a part of the actual pressure difference in the preceding cycle to the pressure value sensed during the preceding cycle while the clamp was in the clamp force maintenance portion of the clamp operating cycle to provide a control signal to close the flow control valve at a time in the clamp operating cycle to provide a clamping force that is closer to the desired clamping force.

2. A method in accordance with claim 1 wherein the step of comparing the actual clamp cylinder hydraulic pressure with the desired clamp cylinder hydraulic pressure includes determining the algebraic difference between the actual and desired pressures to provide an actual pressure difference value.

3. A method in accordance with claim 1 including the step of providing a predetermined pressure difference value and comparing the actual pressure difference value with the predetermined pressure difference value to provide a first correction signal when the actual pressure difference equals or exceeds the predetermined pressure difference value and a second correction signal when the actual pressure difference is less than the predetermined pressure difference value, wherein one of the first and second correction signals is the pressure difference signal used in determining the control signal.

4. A method in accordance with claim 3 wherein the first correction signal is the actual pressure difference.

5. A method in accordance with claim 3 wherein the second correction signal is a predetermined fraction of the actual pressure difference.

6. A method in accordance with claim 4 wherein the second correction signal is a predetermined fraction of the actual pressure difference.

7. A method in accordance with claim 6 wherein the predetermined fraction is about one-tenth.

8. An injection molding machine including an hydraulic clamp cylinder and piston for applying and maintaining a clamping force on a separable mold to maintain the mold in a closed condition, said apparatus comprising:

(a) pressurizing means for providing hydraulic fluid under pressure to a clamp cylinder;

(b) valve means positioned between the pressurizing means and the clamp cylinder, the valve means operable selectively between an open position to permit flow of pressurized hydraulic fluid from the pressurizing means to the clamp cylinder and a closed position to prevent flow of hydraulic fluid from the clamp cylinder to maintain hydraulic fluid under pressure within the clamp cylinder;

(c) set point setting means for selecting and providing a predetermined set point clamping force value;

(d) pressure transducer means in communication with the clamp cylinder for providing an output signal representative of the hydraulic fluid pressure within the clamp cylinder;

(e) comparator means connected with the pressure transducer means and with the set point setting means for comparing the output signal of the pressure transducer means during a clamp force maintenance portion of a clamp operating cycle with the selected set point clamping force value to provide a correction signal representative of the actual pressure difference between the clamping force corresponding with the transducer output signal and the set point clamping force value; and (f) control means connected with the comparator means and with the valve means to provide a control signal for regulating the opening and closing of the valve means during a next succeeding clamp operating cycle to provide a clamping force during the clamp force maintenance portion of that next succeeding cycle that is closer to the set point clamping force value than was the clamping force in the immediately preceding clamp operating cycle.

9. An injection molding machine in accordance with claim 8 wherein the pressurizing means is a pump and wherein the machine includes injection means for injecting plasticated polymeric material into a mold cavity defined by the mold and the pump is disconnected from the clamp cylinder by the valve means and is connected with the injection means and is operable thereby while the mold is closed and is subject to clamping force.

10. An injection molding machine in accordance with claim 8 including decompression valve means communicating with the clamp cylinder for releasing hydraulic pressure in the clamp cylinder upon completion of a mold clamping operation.

* * * * *